METHOD AND APPARATUS FOR DUAL SOUND TRACK RECORDING

Filed March 18, 1957 3 Sheets-Sheet 1

Inventors:
Horst Redlich, Hans-Joachim Klemp
and Georg Neumann
By [signature]
Patent Agent

METHOD AND APPARATUS FOR DUAL SOUND TRACK RECORDING

Filed March 18, 1957 3 Sheets-Sheet 2

Inventors:
Horst Redlich, Hans-Joachim Klemp
and Georg Neumann
By Eric D. Frankel
Patent Agent

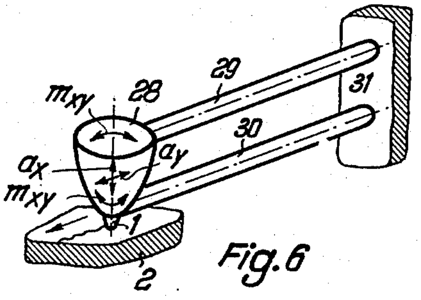
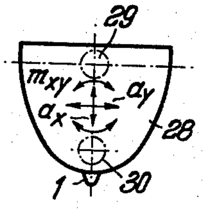
Fig. 7
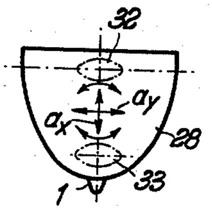
Fig. 8
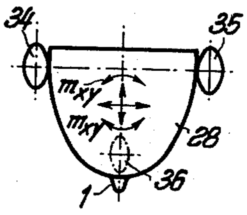
Fig. 9
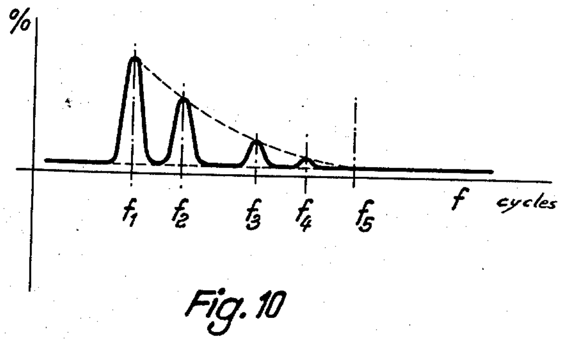
Fig. 10
Inventors.
Horst Redlich, Hans-Joachim Klemp
and Georg Neumann
By [signature]
Patent Agent 2,962,561

METHOD AND APPARATUS FOR DUAL SOUND TRACK RECORDING

Horst Redlich and Hans-Joachim Klemp, Berlin-Steglitz, and Georg Neumann, Heilbronn (Neckar), Germany, assignors to Teldec Telefunken-Decca Schallplatten, G.m.b.H., Hamburg, Germany Filed Mar. 18, 1957, Ser. No. 646,754

Claims priority, application Germany Mar. 20, 1956

28 Claims. (Cl. 179—100.4)

The present invention relates to a method of producing a groove-type sound track in which two different signals may be recorded, and to a cutting apparatus for carrying out this method. In this groove-type sound track, the two signals will be recorded by means of oscillating displacements which are perpendicular with respect to each other, for example, one signal can be recorded on a lateral track, while the other is recorded on a depth-cut track. In prior literature, the lateral track is frequently referred to as the Berliner track, while the depth-cut track is often called an Edison track.

The primary aim of the present invention lies in the application of such method and cutting apparatus to the manufacturing of stereophonic sound records in which a single sound track will simultaneously reproduce the two signals.

It has been known to record on such single sound-track records one signal which is depth-cut and the other signal which is lateral-cut, and to provide the two signals with displacements which are perpendicular with respect to one another in such a manner, that the displacement components of both of these two signals make an angle of 45° with respect to the plane of the record. Furthermore, electromechanical transducer systems have been known in which two electrical signal inputs are employed, whereby displacements of a common cutting stylus in the two displacement directions corresponding to the two signals are produced by means of the internal transducer structure. For example, such a transducer system is described in German Patent No. 816,311, in which dual sound tracks are followed, but which, as indicated in the reference, is also suitable for the cutting of dual sound tracks. However, difficulties have been encountered with the use of the known transducer systems, such as that described in the mentioned German patent, because less than satisfactory crosstalk isolation from one channel to the other could be obtained. These difficulties are partially due to the ract that the T-shaped armature, adapted for dual displacement because of its particular form, could not be designed sufficiently rigid with regard to oscillations within the total frequency range. Furthermore, the mass of the armature could not be made sufficiently small to place the resonant point of the system outside of the frequency range to be reproduced. One cause of crosstalk between the two channels was attributed to difficulties involved in the proper adjustment of the armature to a decoupled position of symmetry, which adjustment was lost during practical use because the drag forces attacking the stylus and the bearings had to be pre-compensated to an extent difficult to predetermine, whereby the faulty compensation caused a considerable crosstalk of variable magnitude between the two channels. A source of disturbing crosstalk was found to result from the tendency of the oscillating system to follow displacements not only in the associated recording direction, but also undesirable displacements in the direction perpendicular thereto resulting from electrical excitation by the signal connected to the input associated with the first recording direction. Such operation was observed particularly at those frequencies in which resonant points of the oscillating system were present in the direction perpendicular with respect to the actual excitation direction.

It is an object of the present invention to avoid the mentioned difficulties and sources of error in a recording method and cutting apparatus for use with stereophonic single groove recordings, or in the manufacture of recordings having one sound groove with a plurality of signals independent of one another.

Based upon a method of producing a groove-type sound track by oscillating a cutter stylus in a plane perpendicular to the tangent to the groove in such manner that the displacements of the stylus in this plane follow signals to be recorded, it is another object of this invention to provide a first displacement transducer for converting a first signal into corresponding displacements of the stylus and to further provide a first feedback coupling or feedback system in the transducer for re-converting part of the mechanical displacements into electrical voltages which are fed back into an amplifier and thence to the first displacement transducer.

It is another object of the invention to provide a similar second feedback coupling system associated with a second displacement transducer and producing a second feedback coupling voltage related to the displacement of the cutting stylus in the second direction which is perpendicular to the component of movement in the first direction and said second voltage being fed via an amplifier to the second displacement transducer similar to the first displacement transducer, but adapted to produce displacements of the stylus in said second direction to which the said second displacement transducer is responsive.

It is another object of the invention to provide in a transducer unit in which a stylus is actuated in two displacement directions a third pair of transducers disposed in a third direction perpendicular with respect to the other two displacement directions and oriented in a third direction in which spurious oscillations may occur, whereby one of the third transducers produces a feedback coupling voltage from the spurious oscillation components, which voltage is transmitted via a third amplifier to the third displacement transducer so as to produce feedback damping, said third displacement transducer acting in the third displacement direction. This arrangement acts in a third direction perpendicular to the actual recording displacement directions like an extremely rigid electrical suspension of the movable system. Thus, the invention is not limited to a method or cutting apparatus adapted to produce sound tracks with two signals in recording directions which are perpendicular with respect to one another. Indeed, the invention may be advantageously applied if a single signal either in depth cut or in lateral cut is to be recorded and spurious oscillations in a direction perpendicular to the displacement direction have to be damped out in a highly effective manner without impairing the flexibility of the movable system with respect to jolts or other stresses.

The principle according to the invention of a feedback coupling in a direction perpendicular to the stylus displacement directions will be primarily applied to such methods and cutting systems in which two displacement components perpendicular with respect to one another are provided for recording. In this case, the resonant points of the arrangement are not only greatly damped in the two displacement directions by the double feedback coupling voltages, but an additional and surprising advantage is obtained in that the crosstalk isolation from one channel to the other is substantially improved. This is useful in a method for recording of two different signals by displacing the stylus in a plane perpendicular to the tangent to the groove in such a manner, that displacements in a certain first direction in the plane correspond to a first signal to be recorded and displacements in a second direction perpendicular to the first direction and, likewise, in this plane correspond to a second signal to be recorded. According to the invention, the displacement direction of the second signal corresponds to the second direction in which the mentioned second displacement transducer oscillates the stylus and to which the mentioned second transducer responds and the second feedback voltage is applied to the second transducer or an equivalent transducer acting in the same direction. The desired increase of the crosstalk isolation is obtained in the following manner: If the system, which is feedback coupled in two directions perpendicular with respect to one another, is oscillated in one displacement direction, but due to the imperfect suspension of the unit tends to also carry out displacements in the other perpendicular direction, there also occurs in the latter direction a strong oscillation damping, even when no drive is applied to the transducer connected to the other signal input. Indeed, the transducer responding to the undesired displacement direction produces a feedback coupling voltage from the undesired displacement motions, which voltage is supplied via an amplifier to the associated displacement transducer and counter-acts the beginning of undesirable displacements. While in case of a simple stylus system for ordinary lateral and depth cutting this action merely avoids undesirable displacement components, there is obtained in the case of recording of two signals the advantage that, due to the avoidance of such undesirable crosstalk displacements in the perpendicular signal direction due to faults in the mounting, the crosstalk isolation in that direction is improved to the extent of the feedback. This action is of great importance for the recording of stereophonic sound tracks on a single sound groove having extremely low distortion characteristics of the individual signals and having a very large crosstalk isolation between the two signals.

The principle of feedback coupling in cutting apparatus for a single displacement direction has been known per se. For example, electro-dynamic transducer systems have been used for producing lateral sound tracks, wherein these transducer systems have a displacement transducer member and in association with the oscillating member a second transducer member which is electrically de-coupled from this oscillating member, said second transducer member producing feedback coupling voltages from the actual mechanical motions. These feedback coupling voltages are applied via the signal amplifier to the displacement transducer member so as to produce damping. A more linear operating characteristic and damping of the self-resonance are both obtained in this known apparatus, though these actions are limited to affecting only the intended single displacement direction. A damping of the component of displacement transverse to the displacement direction was neither intended nor obtained in these known transducers.

It is a further object of the invention to provide in a cutting apparatus for carrying out the inventive method a transducer for actuating the stylus in the direction of the signal displacement and a pair of transducers producing a feedback coupling voltage and for damping undesirable displacements in a direction perpendicular to the signal displacement. Such cutting apparatus may be used for making ordinary sound tracks with a single deflection direction.

The invention is applicable to cutting apparatus for groove-type sound tracks containing two signals. Such arrangements should at least be provided with two pairs of transducers in which the transducer of the one pair displaces and produces feedback in one direction, and the other pair displaces and produces feedback in the other direction.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 5:
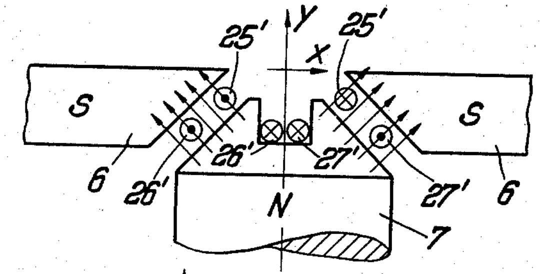

Figures 5, *5a* and *5b* show diagrammatically the operation of a dual transducer system to produce cancellation of unwanted voltage components;

Figure 6 is a further embodiment showing the suspension system of the movable stylus member and serves to explain the displacements of this member corresponding to the so-called three degrees of freedom;

Figure 7 is a front view of the movable member of the system according to Figure 6;

Figures 8 and 9 illustrate front views of modified systems similar to Figure 6 but having two different cross-sectional shapes or designs of the stylus suspension members, respectively;

Figure 10 is a diagram of a curve with reference to which the operation of the transducer according to the invention will be described.

Figure 1:
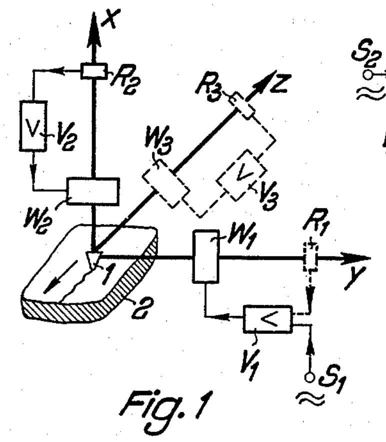
Figures 1 and 2 show schematically two different arrangements and directions of action of the pairs of transducers in space with reference to displacements of the cutting stylus.

Referring in detail to the drawings, in Figure 1, the cutting stylus is denoted by 1, while 2 is the record matrix to be advanced with respect to the cutting stylus in the direction of the arrow. In order to distinguish the components of displacements of the cutting stylus, the three axes $x$, $y$ and $z$ of a three-dimensional coordinate system are illustrated, whereby these coordinates or axes originate in the cutting stylus 1. It can be readily recognized that a displacement of the cutting stylus in the $x$-direction results in depth-cut recording in the groove of the matrix 2. In a corresponding manner, displacements in the $y$-direction produce a lateral-cut sound track. Displacements in the $z$-direction which are along the tangent of the groove can generally not be utilized for signal recording. $z$-Direction movements should be avoided under normal conditions, because the occurrence of such displacements results in disturbing distortions.

It is assumed that the system shown in Figure 1 is to be used for ordinary lateral-cut recording. In this case, the sound signal $S_1$ in the form of an electric current is fed to the stylus displacement member $W_1$ via an amplifier $V_1$ to cause lateral displacements of the cutting stylus 1, which is known, whereby these displacements correspond to the signal $S_1$. It is not important to the application of this invention whether or not, in addition to displacement in the $y$-direction via the transducer member $W_1$, a feedback coupling by means of an element $R_1$ is provided. Therefore, the latter element $R_1$ and its connections to the amplifier $V_1$ are indicated with dash-dash lines.

In case of lateral-cut recording, depth-cut components should be kept as small as possible for obvious reasons. Indeed, forces are exerted on the stylus system by these depth-cut components in a direction in which this system does not have the same freedom of deflection as in the intended signal direction. In order to avoid such undesirable displacements of the cutting stylus 1 in the $x$-direction, a feedback coupling is provided according to the invention, said feedback coupling comprising a circuit including a voltage producing transducer $R_2$, an amplifier $V_2$ and a transducer $W_2$. The oscillating members of most of the transducers are suspended sufficiently rigidly in the *z*-direction so that no appreciable displacement occurs in the latter direction. It is also possible to provide feedback means for undesirable displacement components in the *z*-direction. In such case, the movable member will have to be provided with additional transducer pairs $R_3$ and $W_3$ between which the amplifier $V_3$ is inserted.

Figure 2:
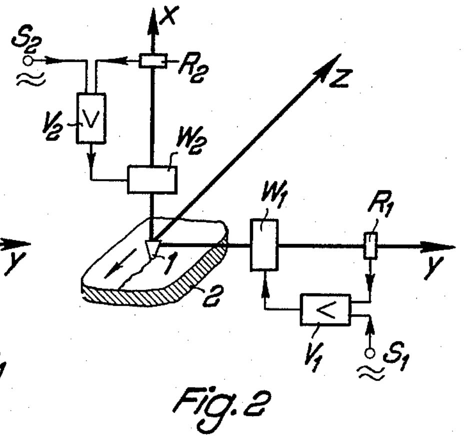

Figure 2 illustrates the application of the invention to a cutting apparatus for simultaneously producing a lateral-cut sound track by displacement in the *y*-direction and a depth-cut sound track by displacement in the *x*-direction. Accordingly, the signal $S_1$ is applied to the transducer $W_1$ via the amplifier $V_1$ and the signal $S_2$ is fed to the transducer $W_2$ via the amplifier $V_2$ in a similar manner. Feedback actions produced by means of the transducers $R_1$ and $R_2$ generating the cancellation components are exerted in one displacement direction and in a direction perpendicular thereto in the manner described in the foregoing. Feedback coupling in the *z*-direction was omitted from Figure 2. However, such coupling in the *z*-direction, as shown in Figure 1 in dash-dash lines, may be provided, if desired, in the cutting systems of Figure 2.

Figure 3:
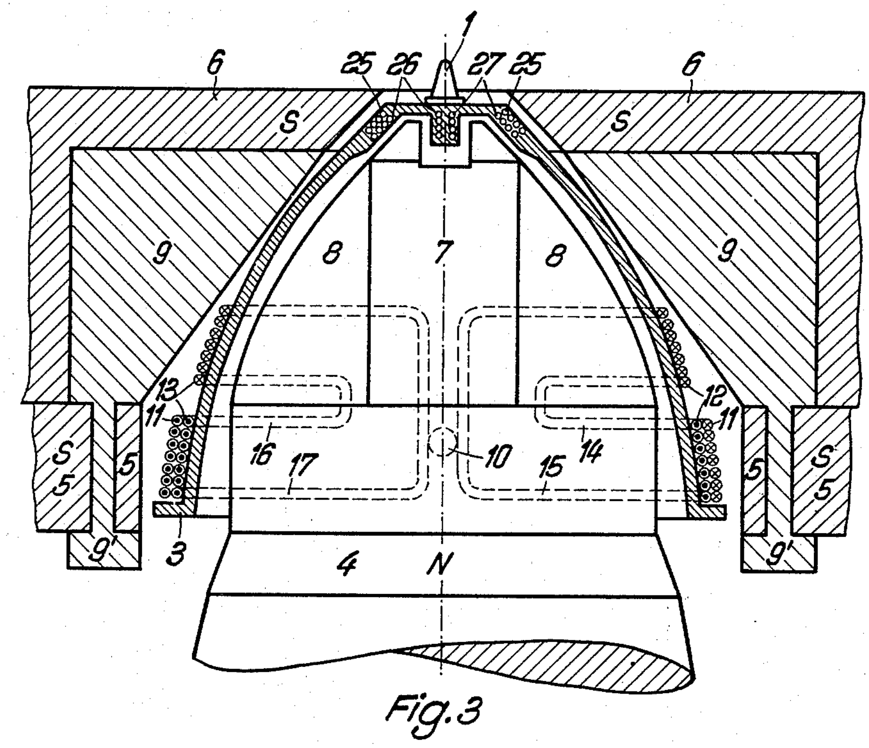
Figure 3 is an enlarged cross-section through the transducer head according to this invention, showing also the permanent magnets of the transducer system.

The displacement system of Figure 3 is adapted to produce a sound groove having two signals. A cutting stylus 1 is mounted on the upper end of a bell-shaped coil body 3 which carries two coils, the lower one near the skirt of the coil body 3, while the upper one is close to the cutting stylus 1. These two coils are located in two adjacent annular gaps of the magnet system around a core 4 which forms, for example, a magnetic northpole. The core 4 has an extension 7 adapted to energize the upper magnetic gap. The outer contours of the magnetic gaps are formed by annular pole shoes 5 and 6. The lower magnetic gap is defined by cylindrical surfaces, while the upper magnetic gap is defined by conical surfaces. Annularly-shaped continuous copper rings 8 and 9 are provided in the immediate neighborhood of the space between the two coils, whereby the axes of these copper rings are parallel with respect to the axes of the coils. These copper rings form shortcircuit windings of very low internal resistance and contribute to the electrical decoupling of the upper and the lower coil systems with respect to one another. In Figure 3, the copper ring 9 extends through two openings in the annularly-shaped pole shoe 5 and is thus joined to a lower annular portion 9' of the ring 9. Such joints are provided at each side of the coil system at least at two places, said joints together forming a shortcircuited winding occupying a plane perpendicular to the plane of the drawing. As a result of this, lateral stray flux from the lower coil is shielded.

The coil body 3 and the transducer parts mechanically connected to the cutting stylus 1 are yieldable in a plane perpendicular to the tangent to the groove, while they are relatively rigidly suspended in the direction of the tangent to the groove. This mounting is obtained by the provision of a shaft 10 located at a certain distance from the cutting stylus 1 in such a manner that the shaft 10 is perpendicular to the plane of symmetry of a second displacement coil 12, 13 and a second feedback coupling coil 26, 27, said plane of symmetry intersecting the axis of the annular gap and core. The important function of the feedback coupling coils will be described below.

Two displacement coils are provided in the lower magnetic gap between the core 4 and the annularly-shaped outer magnet shoe 5. The first displacement coil 11 comprises individual turns, all of which are wound in the same winding direction around the skirt of the coil body. The direction of passage of the instantaneous currents in the coils is indicated in a known manner by a point or a cross on the cross-sectional surface of each individual turn. As indicated by a point on the cross-sectional surface, shown to the left in Figure 3, the individual turns of the coil 11 are arranged in such a manner that the instantaneous current flows into the plane of the drawing away from the viewer, while on the right side of Figure 3, the crosses within the cross-sectional ends indicate that, in this coil, the instantaneous current is directed from the plane of the drawing towards the viewer. The coil body 3 carries within the lower magnetic gap the lower sections of the coils 12, 13 which, together, form the mentioned second displacement coil of the system. It can be readily recognized that the portions of the coil 11 which are close to the coil sections 12 and 13 are wound in opposite directions with respect to the axis of the coil body. The respective turns of these coils extend only over one half of the circumference of the coil body 3. The free ends of the turns are joined by means of the connecting portions 14, 15 and 16, 17 in the manner indicated in Figure 3 by dash-dash lines. It is noted that these joining portions belong only to the inner coil sections 12 and 13 rather than to the coil 11 which is wound continuously on top of one section of the coils 12 and 13 around the coil body 3 without reversal of the winding direction. These joining portions 14, 15 and 16, 17 are provided on the coil body 3 partially above the super-imposed coil sections 11 and 12 or 11 and 13. The planes determined by the active sections of the coils are parallel with respect to the equatorial plane of the coil body 3, while the cutting stylus 1 is located close to the point of intersection of the axis of the annular gaps with the apex of the coil body. The coil body may also have the shape of an ellipsoid of revolution.

If an amplified signal current is fed to the coil 11 in Figure 3, the instantaneous current flows in all of the turns in the same direction around the magnetic core 4. Consequently, a force P will become effective in all of the annular elements of the turns under the action of the magnetic flux between the poles 4 and 5, whereby this force P has the same direction in all of the coil elements, i.e., is parallel to the axis of the annular gap. Therefore, such energization of the coil 11 corresponds to a displacement of the coil body 3 and associated cutting stylus 1 in the direction of the axis of the annular gap. Assuming that the record matrix 2 is above the cutting stylus 1 in a plane perpendicular to the axis of the annular gap, the signal will be recorded as a depth-cut according to the energization of the coil 11.

Figure 4:
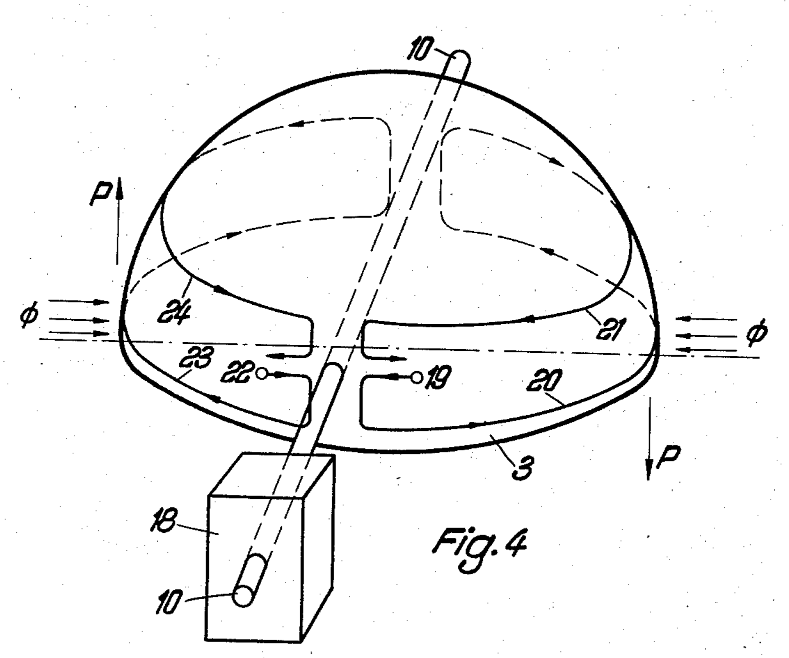
Figure 4 illustrates diagrammatically the suspension of the coil body and the arrangement of one coil of the stylus displacement system.

Figure 4 illustrates the forces exerted on the coil body 3 by feeding a current to the coils 12 and 13 connected in series. The structure of the shaft 10 and its mounting in resilient bearing bodies 18 is clearly shown in Figure 4. The direction of the magnetic flux is indicated by arrows denoted by $\phi$, said flux cutting through the sections of the coils 11 and 12, or 11 and 13, which are within the annular magnetic gap. Two individual sections of the coils 12 and 13 of Figure 3 are denoted in Figure 4 by 20 and 21 or 23 and 24. It is assumed that a current flowing in the direction of the indicated arrows is fed to the coil 20 at 19. The same current, after flowing through the coil sections 20, 21 to the point 22 of the coil sections 23, 24, passes through the latter in the direction of the indicated arrows. Only the sections 20, 23 of the coils illustrated are within the lower magnetic gap, while the coil sections 21, 24 are arranged in an approximately field-free space, so that forces will develop only in the coil sections 20 and 23. It can be seen from the arrangement of these parts that the instantaneous current in the two active coil sections flows away from the viewer toward the rear portions of the coils. Thus, with reference to the axis of the annular gap, the direction of the current flow is opposed in the two coil sections 20 and 23. Therefore, forces P oppositely directed toward one another are exerted in these two coil sections, as indicated by correspondingly directed arrows. The moment of the forces P results in a tilting of the coil body 3 about the shaft 10, whereby the cutting stylus 1 is laterally displaced in the plane of the drawing. Consequently, the signal applied to the coils 12 and 13 is recorded on a lateral-cut track on the record matrix 2.

Feedback coupling coils 25, 26, 27 are arranged above the displacement coils 11, 12 and 13 in the upper magnetic gap between the core extension 7 and the magnet shoe 6. The upper magnetic gap defines conical surfaces, whereby the lines of force of the magnetic field in the gap form an acute angle of preferably about 45° with respect to the axis of the magnetic gaps. The feedback coupling coil 25 is analogous to the displacement coil 11 with respect to the manner of its arrangement on the body 3. The coil 11 is wound in the same direction as the feedback coupling coil 25 on the coil body 3. The coils 26 and 27 correspond to the displacement coils 12 and 13, respectively, though the return connections are not removed from the gap at the sides thereof, but are rather passed through a diametrical slot in the magnet core 7. A suitable protrusion within the coil body 3 occupies this slot and receives connecting portions of the coils 26 and 27 which pass through the slot.

Figure 5A:
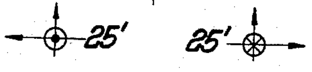
Figure 5B:
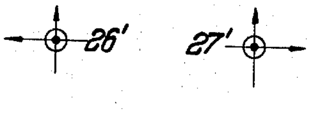

The operation of the feedback coupling coils will be explained with reference to Figures 5, 5*a* and 5*b*. The position and arrangement of the coils 25', 26' and 27' is symbolized in these figures by illustrating a single turn. The above-mentioned symbols for the direction of the current are also used in these illustrations. It can be recognized that an instantaneous current in the same direction with reference to the axis of rotation flows through the total length of the annular coil 25'. Assume that the coil body is subjected to up and down displacements in the direction of the axis of the annular gap corresponding to a depth-cut under the action of a signal fed to the coil 11. In addition to this, the coil body undergoes lateral displacements corresponding to a signal to be recorded on the lateral-cut track under the action of the forces developed by coils 12 and 13. The body 3 responds to all of these displacements which are also followed by the feedback coupling coils 25', 26' and 27'. It is assumed that the two coils 26' and 27' are connected in series. In Figure 5, the direction of displacements corresponding to depth-cut is denoted by $y$, while the direction of displacements corresponding to lateral-cut is denoted by $x$. If an individual turn of the feedback coupling coils 25' undergoes displacements in the direction of the $y$-axis, the components in the $x$-direction of the magnetic field, cutting the upper magnetic gap at 45° with respect to the axis of the gap, are opposed (see Figure 5*a*). Thus, a voltage corresponding to the upward and downward displacements of the cutting stylus 1 and induced in the coil 25' has the same direction in all of the annular elements of the coil. The coil 25' also undergoes displacements in the $x$-direction corresponding to similar displacements of the coil body 3. Figure 5*a* shows that during these displacements, field components in the $y$-direction are also cut. Voltages in opposite directions with respect to the axis of the annular gap are induced during these displacements in the two coil sections arranged in a plane through the axis of the annular gap on both sides and perpendicular to the plane of the drawing. Thus, these voltages cancel one another so that no voltage is present at the terminals of the coil 25 when displacements in the $x$-direction occur. The coil 25' thus can produce a feedback coupling voltage in proportion to displacements in the $y$-direction, but the coil 25' does not supply any voltage for displacement in the $x$-direction.

The coils 26' and 27' also take part in the displacements of the coil body 3. As shown in Figure 5*b*, no resulting voltage occurs in these series-connected coils, due to the opposed winding directions, when displacement takes place in the $y$-direction. However, the field components in the $x$-direction are cut and these components induce oppositely directed voltages in the two coil sections. Now, if the two turns of the coils 26' and 27' are moved in the $x$-direction, the field components in the $y$-direction are cut and the voltages induced thereby flow in these two turns in such a manner that they add to one another. Therefore, the second feedback coupling coil formed by the coils 26' and 27' is solely sensitive to displacements in the $x$-direction.

The actions explained with reference to Figure 2 result from the feeding back of the feedback voltages from the coil 25 to the amplifier feeding the coil 11, and from the coils 26, 27 to the amplifier feeding the coils 12, 13. Therefore, the resonant points of the displacement system are not only substantially cancelled in the directions of the signal displacements, but also the crosstalk isolation between signals to be recorded on the two tracks in the groove is increased.

Tests have shown that signals can be recorded by means of the new cutting apparatus and by applying the method of the invention, whereby the distortion factor of the individual signals was lower than 0.2% and the crosstalk isolation higher than 60 db.

The coil body 3 preferably has the shape of an ellipsoid of revolution or of a hemisphere. An ellipsoidal shape is more suitable since it permits the same mechanical stability with greater separation of the displacement coils from the feedback coupling coils. As a result of this, the electrical decoupling of the coils will be increased, which increase is important from the point of view of stability of the feedback coupling loops. The upper and lower annular gaps may be separated by a distance corresponding to the height of the coil body to such an extent, that the desired degree of electric decoupling is obtained. The gaps are arranged along a common axis. The coil body is preferably of a material in which the sound velocity is in the order of 10,000 m. per sec., in order to avoid too great a phase-shift of the mechanical oscillation between the displacement coils and the feedback coupling coils.

The application of the explained principle, i.e., to exert a feedback coupling action in a direction perpendicular to the direction of the signal displacement, has great importance in a cutting apparatus for single groove stereophonic recording, and generally in any cutting system, in which signals different from one another are recorded in a single sound groove in displacement directions which are mutually perpendicular. As already mentioned, nonlinear distortions are avoided in such case at parasitic resonant points and, at the same time, the crosstalk from one signal channel to the other is substantially decreased.

Considering again the principle of such cutting apparatus according to Figure 2 and assuming for the sake of simplicity that the cutting stylus 1 together with the displacement system is mounted on a resilient rod, the axis of which is parallel with the $z$-axis, this movable system can be displaced approximately on a spherical surface around the clamping point of the resilient rod. In case of small displacements, the utilized portion of the spherical surface may be considered as approximating a plane. The movable system, after this approximation, may carry out displacements in the $x$-$y$ plane. In terms of mechanics, the movable system has then three degrees of freedom of displacement, whereby said degrees of freedom may be considered as displacements in the $x$-direction, in the $y$-direction and as rotations in the $z$-$y$ plane, or about the $z$-axis on the basis of the coordinate system illustrated in Figure 2.

Figure 6 shows a displaceable member 28 carrying at its lower end the cutting stylus 1 and comprising substantially the coil body 3 of Figure 3. This coil body is secured to two resilient rods or tubes 29 and 30 which, in turn, are mounted on a block 31. The displacements in the $x$- and $y$-directions are indicated by $a_x$ and $a_y$, respectively, on the movable member 28, while arrows $m_{xy}$ designate a rotation of the movable member in the $x$-$y$ plane.

If that kind of displacement is considered as the first degree of freedom of plane movement of the displaceable member which is to correspond to the lateral-cut signal according to Figure 6, it is a rotation of this displaceable member about the $z$-axis, or it may be considered as movement in the $z$-$y$ plane. The corresponding displacement components in Figure 6 are denoted by $m_{xy}$. The direction of displacement in the $y$-axis corresponds to the second degree of freedom, said direction being designated by $a_x$ in Figure 6. The latter displacements of the movable member produce a depth-cut track recording. In such cutting apparatus, displacements of the movable member 28 in the $y$-direction are undesirable, so far as they are pure translatory movements, i.e., displacements of the third degree of freedom.

It will be easily understood that three resonant frequencies of the movable member as a mass together with the flexible characteristics of the resilient suspension correspond with the three degrees of freedom of displacement, whereby these resonant frequencies are almost independent of one another. It has been known that such resonant frequencies can cause disturbances in the form of distortions of the recording in the direction of the signal recording. This kind of disturbance can be virtually eliminated, as mentioned, by feedback coupling in the direction of the degree of freedom of the movement employed in the recording. Consequently, it is possible to shift the resonance frequencies in cutting apparatus by use of sufficiently strong feedback action into the frequency range to be reproduced without obtaining too high amplitudes or non-linear distortions at the resonance point.

There remains in such cutting apparatus a resonance frequency in the third degree of freedom of movement neither reduced by the feedback coupling nor utilized for the signal recording. In the diagram of Figure 6, this would be the displacement in the direction of the component $a_y$. The movable member on the resilient rods 29 and 30 can reciprocate, whereby the rods 29 and 30 oscillate in phase.

Practical tests have shown that in case of the conventional suspension of the movable member, the resonant frequencies in the third degree of freedom of displacement are lower than the resonant frequencies of the useful first and second degrees of freedom of the movement. In a tested cutting apparatus, the resonant frequencies of the displacement components $m_{xy}$ and $a_x$ were in the range of 1500 to 1700 cycles. The resonant frequency corresponding to the third degree of freedom was originally at 500 cycles. In this case, when the movable member was energized, either in the first or second degree of freedom at the frequency of 500 cycles, an increase due to resonance in the recording was obtained in the direction of the first or the second degree of freedom. Furthermore, in an apparatus for recording of two signals, there was obtained at the resonant frequency of the third degree of freedom a crosstalk from the channel of the first signal to the channel of the second signal, and vice versa.

It has been found by tests that these disturbances by undesired and uncontrollable oscillations of the movable member occur in the third degree of freedom, said oscillations building up to considerable amplitude if the member is stimulated to oscillate in the first or second degrees of freedom.

It may be desirable to cause damping of the movable member by a feedback coupling action in the direction of the third degree of freedom. However, practical tests have shown that there is a simpler way to dampen the undesired oscillation in the third degree of freedom.

For this purpose, the resonant frequency associated with the displacement component of the third degree of freedom of the movable member may be selected approximately equal to one of the resonant frequencies corresponding to the mentioned first or second degree of freedom, whereby, preferably, the last mentioned resonant frequencies are selected likewise to have nearly the same values.

Practical tests with such selection of the resonant frequency in the third degree of freedom have shown that the distortions occurring in case of a single signal recording are practically eliminated at this frequency by the feedback coupling already present, and the disturbing crosstalk at the resonant frequencies will be eliminated in case of use of the cutting apparatus for dual signal recording. Though, theoretical explanations of the operations appear to be very complicated, it seems that, in case of such selection of the resonant characteristics, the phases of the cancellation voltages are such as to dampen the parasitic oscillation when its resonant frequency has the selected value. Tests have proved this to be true. In the diagram of Figure 10, the frequency $f$ in cycles is plotted on the axis of the abscissa, while the crosstalk amplitudes in percent of a reference value are plotted on the axis of the ordinate, said amplitudes being obtained, for example, in case of dual signal recording on a depth-cut track, when the lateral sound track channel is energized by a signal voltage of the mentioned frequency. $f_1$, $f_2$, $f_3$ and $f_4$ are the positions of the resonant frequencies of the first degree of freedom for the system tested. $f_5$ is the resonant frequency of the same system in direction of the two degrees of freedom used for the signal recording. If in the tested system the resonant frequency $f_1$ of the third degree of freedom was originally 500 cycles, the amplitude of the crosstalk signal was correspondingly high, due to the large distance of this frequency from the resonant frequency $f_5$. If the resonant frequency of the third degree of freedom was gradually lowered to equal the values $f_2$–$f_4$ of the resonant frequency $f_5$, resonant humps in the crosstalk characteristic became smaller at each corresponding frequency when $f_5$ was approached. When, finally, the resonant frequency of the third degree of freedom was made equal with $f_5$, the corresponding resonant hump disappeared entirely under the action of the feedback acting in the direction of the first and second degrees of freedom.

The required resonant frequencies can be selected by choosing of the constants of resiliency and of the resistance moments of the resilient members in different displacement directions. In the practical realization of the invention, an apparatus is preferably used in which the resilient members are mounted at one side, as shown in Figure 6, wherein the resilient members are fixed at the side of the plane of movement of the system. In this case, a construction is used in which the axes of the two resilient members occupy a common plane intersecting the tangent to the groove at the point of contact of the cutting stylus and being perpendicular to the surface of the sound carrier at said point of contact. To facilitate the understanding, an end view of the apparatus of Figure 6 is shown in Figure 7, according to which the resilient members 29 and 30 have circular cross sections. It is possible to use tubular cross sections for these members. If the resonant frequency need be increased in the direction of the third degree of freedom of displacement, i.e., in the direction of the component $a_y$, the resilient members 32 and 33 may have different resistance moments in two reference directions which are perpendicular with respect to one another. The cross-sectional surfaces become ellipses, the large axes of which are parallel to the surface of the sound carrier at the point of contact of the cutting stylus. The resilient members are preferably designed in such manner, that their cross sections are the same throughout the length of these members or are at least similar to one another. This means that primarily cylindrical or conical shapes to be used for these resilient members.

Figure 9 shows how the movable member 28 is secured by means of three resilient members 34, 35 and 36, having elliptical cross sections, whereby the small axes of the ellipses are parallel with respect to the surface of the sound carrier at the point of contact of the cutting stylus. The axes of the three resilient members are on the edges of an at least approximately equilateral prism. By suitably spacing the axes of these resilient members, the requirement of making equal the resonant frequencies in the different degrees of freedom can be fulfilled. Such mounting has a certain symmetry of performance with reference to the axis of gravity of the prism, so that the resonant frequencies of the displacement directions $a_x$ and $a_y$ will have the same magnitudes. The resonant frequency of the torsional oscillation corresponding to $m_{xy}$ can be readily brought to the same value by suitably selecting the moments of resistance of the resilient members and suitably spacing the distances of the tubular members.

We claim:

1. A recording and pick-up system for use with a groove-type sound track carrier, wherein a stylus is displaced in a plane perpendicular to the tangent to the groove in proportion to recording signals, comprising a body supporting said stylus; resilient suspension means supporting said body; a first displacement transducer on said body for displacing the stylus in a first direction in said plane according to a first signal; a first amplifier having an input to receive recording signals and connected to said first displacement transducer; a feedback transducer on said body and generating a feedback voltage proportional to the actual movements of said stylus in a second direction perpendicular to said first direction; a second displacement transducer on said body for displacing said stylus in said second direction; and a second amplifier connected between said feedback transducer and said second displacement transducer and feeding back a portion of said feedback voltage to said second displacement transducer.

2. In a system as set forth in claim 1, said second direction also lying in said plane, an input to said second amplifier to receive recording signals to be applied to said second displacement transducer, the displacement of the stylus in the second direction being proportional to the magnitude of said latter signals and inversely proportional to the magnitude of said second voltage.

3. A recording and pick-up system for use with a groove-type sound track carrier, wherein a stylus is displaced in a plane perpendicular to the tangent to the groove in proportion to recording signals, comprising a body supporting said stylus; resilient suspension means supporting said body; a displacement transducer on said body for displacing the stylus in a first direction in said plane according to a first signal; a first feedback transducer on said body and generating a first voltage proportional to the actual movements of said stylus in said first direction; a first amplifier having an input to receive recording signals and said amplifier being connected between said first transducers and feeding back a portion of said first voltage to said first displacement transducer; a second feedback transducer on said body and generating a second voltage proportional to the actual movements of said stylus in a second direction perpendiular to said first direction; a second displacement transducer on said body for displacing said stylus in said second direction; and a second amplifier connected between said second transducers and feeding back a portion of said second voltage to said second displacement transducer.

4. In a system as set forth in claim 3, said second direction also lying in said plane, an input to said second amplifier to receive recording signals to be applied to said second displacement transducer, the displacement of the stylus in the second direction being proportional to the magnitude of said latter signals and inversely proportional to the magnitude of said second voltage.

5. In a system as set forth in claim 3, said stylus being connected to one end of said body; magnet means adjacent said body and propagating fixed magnetic fields crossing and penetrating said body; and said transducers each comprising a coil wound on said body and cooperating with said fields to produce said displacements and generate said voltages.

6. In a system as set forth in claim 5, said body comprising an annular bell-shaped member having said stylus fixed at its axis, and said suspension means comprising an arm pivotally fixed at its outer end and permitting free movement of the body in said plane, but rigidly preventing movement of the body in the direction of the said tangent, the arm extending parallel thereto.

7. In a system as set forth in claim 6, said suspension means comprising at least one rod fixed to said body perpendicular to its axis and disposed parallel to said tangent, said rod being supported remotely from the body in resilient bearings.

8. In a system as set forth in claim 5, said displacement transducers respectively comprising first and second displacement coils supported on said body within one annular area thereof, and said feedback transducers comprising first and second feedback coils fixed to said body in a different annular area thereof, the two annular areas being mutually separated axially of the body.

9. In a system as set forth in claim 8, said magnet means having at least two air gaps, one annular area being located in one gap and said different annular area being located in a different gap, and the two gaps being separated axially of the body to provide magnetic decoupling of the feedback coils with respect to the displacement coils.

10. In a system as set forth in claim 9, at least one annular copper ring disposed between said areas and coaxial with said body.

11. In a system as set forth in claim 9, said coil body being a hollow figure of revolution having a pole end to which is attached the stylus and having an equatorial plane to which said coil areas and said magnetic gap areas are mutually parallel.

12. In a system as set forth in claim 11, said body being a hemisphere.

13. In a system as set forth in claim 11, said body being an ellipsoid.

14. In a system as set forth in claim 11, said body being made of material in which the sound velocity is of the order of 10,000 meters per second.

15. In a system as set forth in claim 11, said first displacement coil being wound around said body in said equatorial area in an air gap and coaxial with said axis, and said second displacement coil comprising two symmetrical sections respectively located on opposite sides of the body, both of the second displacement coil sections having a plurality of turns, each of which includes an active portion of the turn located within a portion of said equatorial area and in an air gap and a nonactive portion of the turn located remotely of said equatorial area, and the respective coil sections being connected in series opposition to form the second displacement coil so that currents therein induced by axial motion of the body cancel each other and currents therein induced by rocking motion wherein the coil sections are displaced in axially opposite directions are additive.

16. In a system as set forth in claim 15, said magnetic means comprising inner and outer concentric pole pieces adjacent said body and defining a cylindrical gap concentric with the axis of the body.

17. In a system as set forth in claim 15, said inner magnetic pole piece having a diametrical bore therethrough, said first feedback coil being wound around said body in the coil area within said different magnetic gap and coaxial with its axis, and said second feedback coil comprising two symmetrical sections respectively located on opposite sides of the body, both of the second feedback coil sections having a plurality of turns each of which includes an active portion of the turn located within a portion of said different magnetic gap and a non-active portion of the turn passing diametrically through bore and the respective coil sections being connected in series opposition to form the second feedback coil so that currents therein induced by axial motion of the body cancel each other and currents therein induced by rocking motion wherein the coil sections are displaced in axially opposite directions are additive.

18. In a system as set forth in claim 17, said inner magnetic pole piece being conical in the feedback coil area, and an outer magnetic pole piece having a conical inner surface, and said body passing therebetween.

19. In a system as set forth in claim 17, said body being suspended on a pivot joining it to said magnet means and disposed perpendicular to the plane of symmetry of said second displacement and feedback coils and being located on said body closer to the displacement coils than to the feedback coils, said plane of symmetry containing the axes of said magnetic gaps.

20. In a system as set forth in claim 3, said system being mounted within a recording unit and said stylus being suspended so as to have first and second mutually perpendicular directions of freedom of movement within said plane, the suspension comprising at least one resilient rod fixed to said unit and extending in a third direction perpendicular to said plane and along said tangent, the outer rod ends being fixed for rigid support.

21. In a system as set forth in claim 20, said combined suspension and unit having resonant frequency characteristics for each of said three directions, and the resonance characteristics of the suspension and unit in the direction of said tangent being selected to approximately equal the characteristics thereof in the first and second directions.

22. In a system as set forth in claim 21, said resonance characteristics in the first and the second directions being substantially equal.

23. In a system as set forth in claim 20, said suspension comprising upper and lower rods fixed to points spaced axially of said body in the unit and connected on the same side thereof.

24. In a system as set forth in claim 23, the axes of said rods lying parallel within a plane also containing the axis of the body and the tangent to the groove.

25. In a system as set forth in claim 20, said suspension comprising three rods fixed to said unit with their axes disposed mutually parallel as are the edges of an equilateral triangular prism.

26. In a system as set forth in claim 20, said suspension rods being of uniform cross-section along their lengths, but having moments of resistance to bending which are different in two mutually perpendicular reference directions intersecting at the rod axes.

27. In a system as set forth in claim 26, said rods being of elliptical cross-section.

28. In a system as set forth in claim 27, one major axis of said elliptical cross-section being parallel to the surface of the sound carrier at the point of contact of the stylus therewith.

References Cited in the file of this patent

UNITED STATES PATENTS

| | | |
|---|---|---|
| 2,114,471 | Keller et al. | Apr. 19, 1938 |
| 2,161,489 | Vieth et al. | June 6, 1939 |
| 2,162,986 | Wiebusch | June 20, 1939 |